United States Patent
Park

(10) Patent No.: US 10,450,437 B2
(45) Date of Patent: *Oct. 22, 2019

(54) RESIN FOR THERMOPLASTIC POLYURETHANE YARN USING NANOSILICA AND METHOD FOR-MANUFACTURING THERMOPLASTIC POLYURETHANE YARN USING THE SAME

(71) Applicant: Heedae Park, Busan (KR)

(72) Inventor: Heedae Park, Busan (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/479,564

(22) Filed: Apr. 5, 2017

(65) Prior Publication Data

US 2018/0100050 A1 Apr. 12, 2018

(30) Foreign Application Priority Data

Oct. 10, 2016 (KR) .......................... 10-2016-130490
Oct. 24, 2016 (KR) .......................... 10-2016-138458
Mar. 6, 2017 (KR) ............................ 10-2017-28116

(51) Int. Cl.
- C08K 3/36 (2006.01)
- C08G 18/08 (2006.01)
- C08G 18/66 (2006.01)
- D01F 1/10 (2006.01)
- D01F 6/70 (2006.01)

(52) U.S. Cl.
CPC ............ *C08K 3/36* (2013.01); *C08G 18/0895* (2013.01); *C08G 18/6607* (2013.01); *D01F 1/10* (2013.01); *D01F 6/70* (2013.01); *C08K 2201/011* (2013.01)

(58) Field of Classification Search
CPC ....... C08K 3/36; C08K 2201/011; D01F 6/70; D01F 1/10; D01D 5/00; D01D 5/08; D01D 5/0023; C08G 18/6607; C08G 18/0895
See application file for complete search history.

(56) References Cited

U.S. PATENT DOCUMENTS

| | | | |
|---|---|---|---|
| 6,294,606 B1 * | 9/2001 | Chen | G03G 9/0806 430/137.14 |
| 9,914,808 B2 * | 3/2018 | Park | C08J 3/226 |
| 9,914,819 B2 * | 3/2018 | Park | D06M 15/564 |
| 9,915,026 B2 * | 3/2018 | Park | C08J 3/226 |
| 9,915,027 B2 * | 3/2018 | Park | D06M 15/564 |
| 2001/0000801 A1 * | 5/2001 | Miller | A61F 2/95 623/1.11 |
| 2001/0002444 A1 * | 5/2001 | Zilla | A61F 2/06 623/1.39 |
| 2001/0025093 A1 * | 9/2001 | Ishizaki | C08J 3/12 526/210 |
| 2004/0123366 A1 * | 7/2004 | Schorr | A41D 13/1209 2/69 |
| 2006/0083694 A1 * | 4/2006 | Kodas | B01J 13/0043 424/46 |
| 2009/0242847 A1 * | 10/2009 | Hosoya | G02F 1/167 252/500 |
| 2013/0115447 A1 * | 5/2013 | Blanchard | B27N 7/005 428/340 |
| 2013/0273285 A1 * | 10/2013 | Vedula | C08G 18/3206 428/36.9 |
| 2014/0308454 A1 | 10/2014 | Park | |
| 2016/0340828 A1 | 11/2016 | Park | |
| 2017/0369675 A1 * | 12/2017 | Park | C08K 3/36 |
| 2017/0370045 A1 * | 12/2017 | Park | D06M 15/564 |

FOREIGN PATENT DOCUMENTS

| | | |
|---|---|---|
| KR | 10-1318135 B1 | 10/2013 |
| KR | 10-1341054 B1 | 12/2013 |
| KR | 10-1341055 B1 | 12/2013 |
| KR | 10-1530149 B1 | 6/2015 |

* cited by examiner

*Primary Examiner* — Patrick D Niland
(74) *Attorney, Agent, or Firm* — Park & Associates IP Law, P.C.

(57) ABSTRACT

The present invention provides a resin for thermoplastic polyurethane (TPU) yarn using nanosilica and a method for manufacturing a thermoplastic polyurethane yarn using the same, where nanosilica having a particle size of 100 nm or less is added as a thickening agent for improving productivity and glossiness in the production of thermoplastic polyurethane yarns (preferably, mono- or multi-filament yarns using TPU alone), specifically in the production of thin TPU yarns, such as mono-filament TPU yarns having a denier count of 50 to 350 or multi-filament TPU yarns having a denier count of 50 or less without applying a coating of TPU to the surface of polyester or nylon yarns as disclosed in the prior art, thereby securing desired workability and properties and realizing continuous drawing of TPU yarns without thread breakage.

5 Claims, No Drawings

RESIN FOR THERMOPLASTIC POLYURETHANE YARN USING NANOSILICA AND METHOD FOR-MANUFACTURING THERMOPLASTIC POLYURETHANE YARN USING THE SAME

REFERENCE TO RELATED APPLICATIONS

This application claims the priority benefit of Korean Patent Application No. 10-2016-130490 filed on Oct. 10, 2016, Korean Patent Application No. 10-2016-138458 filed on Oct. 24, 2016, and Korean Patent Application No. 10-2017-28116 filed on Mar. 6, 2017, the entire contents of which are incorporated herein by reference.

FIELD OF THE INVENTION

The present invention relates to a resin for thermoplastic polyurethane yarn using nanosilica and a method for manufacturing thermoplastic polyurethane yarn using the resin and, more particularly, to a resin for thermoplastic polyurethane yarn using nanosilica and a method for manufacturing thermoplastic polyurethane yarn using the resin, where it is possible to fabricate TPU thread continuously without a thread breakage (that is, a situation that the TPU thread breaks or snaps in a continuous process) by adding nanosilica in the fabrication of mono- or multi-filament yarns from thermoplastic polyurethane alone.

BACKGROUND OF THE INVENTION

The yarns for footwear upper or industrial uses, as it is well known, are mostly polyester, nylon, acryl resin, or the like. The fabrics processed from those yarns are not only poor in durability and wear resistance, but also problematic in many aspects including adhesiveness, so they are unfit to use for high level functionality such as of footwear fabrics or the like.

Currently, a solution to this problem is a yarn (hereinafter, referred to as "coated yarn") of which the surface is coated with a thermoplastic resin in order to enhance the strength of the yarn. Such a coated yarn is generally fabricated by applying a coating of a thermoplastic resin such as PVP or PP or a thermoplastic polyurethane resin on a yarn like polyester or nylon in a dice using a general extruder.

But, when using a general thermoplastic resin, it is difficult to control the amount of the coating, particularly making it impossible to use a small amount of the coating, ending up producing a thick coated yarn having a high denier count above 350 and leading to deterioration in durability and wear resistance.

In an effort to solve this problem, as can be seen from the following patent documents 1 to 4, the inventors of the present invention have been making sustained research and development on a fabrication method for coated yarn, a compound for coated yarn, a thermoplastic polyurethane coated yarn, etc. since 2012.

These prior patents may produce coated yarns with excellences in wear resistance, adhesiveness, water resistance, molding properties, etc. Yet, the coated yarns of the prior patents are bound to have a core like polyester or nylon, which results in large thickness, making it impossible to realize a coated yarn of thinness.

Besides, the TPU coated yarns disclosed in the prior patents have such a viscosity not as high as polyester or nylon due to the characteristics of the thermoplastic polyurethane, so a thickening agent is necessarily used for the sake of smooth implementation of the extrusion process.

For single yarns, however, things are different from the TPU coated yarns of the prior patents. Silica of normal size may be used as a thickening agent for thick mono-filament yarns, but it cannot be used for thin multi-filament yarns, more specifically for multi-filament yarns having a denier count less than about 50. Even in the case of mono-filament yarns (for example, mono-filament yarns having a denier count of 50 to 350) using general silica, thread breakage (namely, the situation that the thread breaks or snaps) occurs inevitably in the drawing process. This makes it impossible to produce TPU yarns continuously and hence leads to low productivity.

Accordingly, silica of normal size as suggested above is unavailable in the continuous production of TPU yarns to draw mono- or multi-filament yarns comprised of thermoplastic polyurethane continuously. In particular, general silica is unfit to use as a thickening agent in drawing thin TPU yarns (namely, a single filament yarn that is less than 50 denier for multi-filament yarn and between 50 to 350 denier for mono-filament yarn) continuously without thread breakage.

SUMMARY OF THE INVENTION

The present invention is to solve the problems with thermoplastic polyurethane coated yarns as disclosed in the prior documents. It is therefore an object of the present invention to provide a resin for thermoplastic polyurethane yarn using nanosilica and a method for manufacturing a thermoplastic polyurethane yarn using the same, where silica of nanoscale size is used as a thickening agent suitable for the production of thin yarns using TPU alone to secure desired workability and properties and to draw TPU yarns continuously without thread breakage in the drawing process.

It is another object of the present invention to provide a resin for thermoplastic polyurethane yarn using nanosilica and a method for manufacturing a thermoplastic polyurethane yarn using the same, where TPU yarns can be drawn continuously without thread breakage in the production of mono-filament yarns using TPU alone.

It is still another object of the present invention to provide a resin for thermoplastic polyurethane yarn using nanosilica and a method for manufacturing a thermoplastic polyurethane yarn using the same, where mono-filament yarns having a denier count of 50 to 350 can be drawn continuously in the production of mono-filament yarns using TPU alone.

It is still further another object of the present invention to provide a resin for thermoplastic polyurethane yarn using nanosilica and a method for manufacturing a thermoplastic polyurethane yarn using the same, where TPU yarns can be drawn continuously without thread breakage in the production of multi-filament yarns using TPU alone.

It is still another object of the present invention to provide a resin for thermoplastic polyurethane yarn using nanosilica and a method for manufacturing a thermoplastic polyurethane yarn using the same, where a single filament yarn having a denier count of 50 to 350 can be drawn continuously in the production of multi-filament yarns using TPU alone.

The resin for thermoplastic polyurethane yarn according to the present invention comprises thermoplastic polyurethane and nanosilica having a particle size of 100 nm or less.

The method for manufacturing a TPU (thermoplastic polyurethane) yarn using the resin for TPU comprises: (a) preparing liquid base materials of polyol, isocyanate and short-chain glycol for polymerization of TPU pellets, selecting one of the liquid base materials, adding nanosilica having a particle size of 100 nm or less, and mixing the selected liquid base material and the nanosilica together; (b) adding the nanosilica-dispersed liquid base material and the other two base materials into an extruder and performing polymerization into TPU pellets to prepare a resin for TPU yarn; and (c) adding the resin for TPU yarn into an extruder for yarn production and performing a melt extrusion to produce a thermoplastic polyurethane yarn.

Another method for manufacturing the TPU yarn comprises: (a) compounding thermoplastic polyurethane and nanosilica having a particle size of 100 nm or less to prepare a master batch in the form of pellet, mixing the master batch and thermoplastic polyurethane together and then compounding the master batch and the thermoplastic polyurethane to prepare a resin for production of yarn; and (b) adding the resin for yarn production into an extrusion for yarn production and performing a melt extrusion to prepare a thermoplastic polyurethane yarn.

In this regard, the TPU yarn is a mono-filament yarn having a denier count of 50 to 350, and the silica added has a particle size of 100 nm or less.

Further, the TPU yarn is a multi-filament yarn of which a single filament yarn has a denier count of 50 or less, and the silica added has a particle size of 100 nm or less.

The present invention not only realizes the effects of the thermoplastic polyurethane coated yarn disclosed in the prior patents, but also enables drawing TPU yarns continuously without thread breakage by adding nanosilica (100 nm or less in particle size) in the fabrication of mono- or multi-filament yarns using TPU alone.

In addition, the present invention enables continuously drawing multi-filament yarns using TPU alone and having a denier count of 50 or less and mono-filament TPU yarns having a denier count of 50 to 350 as well without thread breakage, thereby enhancing productivity

DETAILED DESCRIPTION OF THE INVENTION

Hereinafter, the preferred embodiments of the present invention will be described in detain as follows. In the following detailed description, representative examples of the present invention will be given in order to achieve the above-described technical solutions. And, other embodiments that the present invention may provide are substituted by the detailed description of the present invention.

The term "nanosilica" as used herein means silica having a primary particle size of 100 nm or less, and the term "yarn" as used herein refers to a mono- or multi-filament yarn comprised of thermoplastic polyurethane (TPU) alone. Further, the term "producing TPU yarns continuously" means continuously drawing TPU yarns without thread breakage.

The present invention is to realize a resin for thermoplastic polyurethane yarn using nanosilica and a method for manufacturing a thermoplastic polyurethane yarn using the same, where nanosilica having a particle size of 100 nm or less is added as a thickening agent for improving productivity and glossiness in the production of thermoplastic polyurethane yarns (preferably, mono- or multi-filament yarns using TPU alone), specifically in the production of thin TPU yarns, such as mono-filament TPU yarns having a denier count of 50 to 350 or multi-filament TPU yarns having a denier count of 50 or less without applying a coating of TPU to the surface of polyester or nylon yarns as disclosed in the above-mentioned prior patents, thereby securing desired workability and properties and realizing continuous drawing of TPU yarns without thread breakage.

As stated above, nanosilica (having a primary particle size of 100 nm or less) is used in order to draw TPU yarns continuously without thread breakage in the continuous production of TPU yarns. Preferably, the nanosilica of the present invention is used in the production of a thin multi-filament yarn (that is, a single filament yarn) having a denier count of 50 or less, because such a thin filament yarn cannot be drawn with silica of normal size. The nanosilica of the present invention is preferably used in the production of mono-filament yarns as well in order to draw the yarns continuously without thread breakage in the drawing process.

The present invention also proposes a method for manufacturing a thermoplastic polyurethane yarn using TPU alone without a core, which method comprises compounding a master batch using nanosilica and thermoplastic polyurethane and then performing a melt extrusion in an extruder for yarn production.

For this purpose, it is necessary to disclose a TPU resin composition used in the fabrication of the thermoplastic polyurethane yarn and its preparation method; a method for preparing a master batch for thermoplastic polyurethane yarn and its composition; and a specific method for processing a thermoplastic polyurethane yarn using the TPU resin or the master batch. Such methods are applied in the same manner in the fabrication of mono-filament yarns and multi-filament yarns.

The preferred embodiments of the present invention may be described in detail as follows.

Example 1

The present invention is directed to a method for processing or manufacturing a thermoplastic polyurethane (hereinafter, referred to as "TPU") yarn using TPU alone without applying a coating of TPU to the surface of a polyester or nylon yarn.

The TPU as used in the present invention is TPU in the form of virgin. The virgin TPU is prepared by polymerizing short-chain glycols, such as polyester glycol, polyether glycol, polycarprolactone, etc. used as a chain extender with aromatic isocyanate and aliphatic isocyanate.

The present invention may also use any kind of TPU scrap, including footwear TPU scraps remaining after a high frequency process or TPU scraps after a hot melt TPU process, instead of the virgin TPU. Such TPU scraps may be used alone or in combination with the virgin TPU.

In the production of core-free TPU yarn using TPU alone without applying a coating of TPU to the surface of polyester or nylon yarns, the present invention uses nanosilica having a particle size of 100 nm or less to draw the TPU yarn continuously without thread breakage during the extrusion process, thereby enhancing productivity and improving glossiness.

In other words, the present invention includes adding nanosilica powder having a particle size of 100 nm or less to one of the liquid base materials for polymerization of TPU pellets, that is, polyol, isocyanate and short-chain glycol, sufficiently mixing them together, and performing polymerization into TPU pellets to prepare a resin for single type yarn processing. In this regard, the content of the nanosilica used in the present invention is preferably at most 10%. Adding the nanosilica in an amount of greater than 10% makes the mixing difficult.

In an alternative way, the present invention includes concentrating and compounding nanosilica powder having a particle size of 100 nm or less in general TPU to prepare a master batch and then adding the master batch to a PTU resin by the content to prepare a TPU resin for single type yarn processing. In the preparation of the master batch, the content of the nanosilica is preferably at most 40%. The master batch is added to the TPU by the content to prepare a TPU resin for single type yarn processing. When the content of the nanosilica exceeds 40%, mixing with the TPU is difficult to perform, making impossible to manufacture a master batch and a TPU yarn as well. Accordingly, the present invention adds the nanosilica having a particle size of 100 nm or less in a content of at most 40% to the TPU. For the preparation of an ideal master batch, the preferable content of the nanosilica is 30%.

The following descriptions are given as to: (1) a method of preparing a resin for TPU yarn by adding nanosilica having a particle size of 100 nm or less to a liquid base material; (2) a method of preparing a master batch by mixing nanosilica having a particle size of 100 nm or less and TPU; and (3) a method of manufacturing a core-free single type TPU yarn using the resin for TPU yarn or the master batch.

1. Method for Preparing Resin for TPU Yarn According to the Present Invention

The preparation method of the resin for TPU yarn involves adding nanosilica to liquid base materials in the polymerization of TPU pellets and performing a polymerization to prepare a resin. The preparation method consists of four steps.

Step 1: Liquid base materials for general polymerization of TPU pellets are prepared. More specifically, polyol, isocyanate and short-chain glycol are prepared.

Step 2: One of the liquid base materials prepared in Step 1 is selected, and nanosilica powder having a particle size of 100 nm or less is added to the selected liquid base material. During the mixing process, the temperature is preferably 80 to 100° C. and the mixing speed is 20 to 30 rpm. For example, the present invention includes mixing nanosilica and polyol together.

Step 3: The liquid base material in which the nanosilica is sufficiently dispersed in Step 2 and the other two liquid base materials are added into a reactive extruder at the same time to perform a polymerization into TPU pellets.

Step 4: The TPU pellets polymerized in Step 3 are dried and annealed to prepare a desired resin for TPU yarn according to the present invention.

2. Method for Preparing Master Batch According to the Present Invention

Step 1: The above-suggested TPU (e.g., virgin TPU, TPU scrap, or a mixture of virgin TPU and TPU scrap) and nanosilica having a particle size of 100 nm or less are weighed. In this regard, the content of the nanosilica is not to exceed 40%.

Step 2: The nanosilica and the TPU are added into a general kneader and mixed together at temperature of 100 to 120° C. and a mixing speed of 20 to 30 rpm.

Step 3: The TPU mixed with the nanosilica is cooled down and pulverized to a diameter smaller than 10 mm. The pulverized TPU is added into a general twin extruder. The temperature of the twin extruder is 150 to 200° C.

Step 4: A cooling water at 15 to 20° C. is added to the resin prepared in the twin extruder to make the resin into pellets.

Step 5: The master batch prepared throughout Steps 1 to 4, more specifically the master batch made into pellets is dried and annealed by a general method.

Step 6: The master batch is mixed with normal TPU to prepare a TPU resin for yarn processing.

3. Method for Preparing TPU Yarn According to the Present Invention

The preparation method for TPU yarn as specifically described below is to prepare a core-free single type TPU yarn without applying a coating of TPU to the surface of a polyester or nylon yarn as disclosed in the prior patents.

Specific descriptions are given as to a method for manufacturing a mono-filament yarn using TPU alone and a method for manufacturing a multi-filament yarn using TPU alone in regards to the preparation of TPU yarn.

(A) Method for Manufacturing Mono-Filament Yarn

Step 1: Thermoplastic polyurethane containing nanosilica having a particle size of 100 nm or less is prepared. Preferably, a resin for TPU yarn with nanosilica or a master batch with nanosilica is mixed with TPU to prepare a TPU resin. The TPU resin is added into a general extruder for processing mono-filament yarns and subjected to melt extrusion at 170 to 230° C.

Step 2: After melt extrusion in the extruder, the (TPU) yarn coming out from the dice of the extruder is cooled down with a cooling water at 25 to 40° C.

Step 3: The cooled yarn is drawn. In the present invention, the yarn is drawn to at most 7 times its original length, because it breaks when drawn to more than 7 times.

Step 4: The drawn yarn is annealed at 150 to 160° C. for 30 to 60 seconds in a general heat chamber.

Step 5: The annealed TPU yarn is wound up.

As described above, the present invention uses nanosilica having a particle size of 100 nm or less to continuously draw the TPU yarn without thread breakage in the drawing step (Step 3) and the winding step (Step 5) in the manufacture of mono-filament (TPU) yarns.

(B) Method for Manufacturing Multi-Filament Yarn

Step 1: Thermoplastic polyurethane containing nanosilica having a particle size of 100 nm or less is prepared. Preferably, a resin for TPU yarn with nanosilica or a master batch with nanosilica is mixed with TPU to prepare a TPU resin. The TPU resin is added into a general extruder for processing mono-filament yarns and subjected to melt extrusion at 170 to 230° C.

Step 2: After melt extrusion in the extruder, the (TPU) yarn coming out from the dice of the extruder is collected by the number of fillers (for example, 36 fillers, 48 fillers, etc.). Preferably, the yarn coming out from the dice is air-cooled down to 25 to 40° C. when collected by the number of fillers.

Step 3: The collected yarn in Step 2 is drawn. In the present invention, the yarn is drawn to at most 7 times its original length, because it breaks when drawn to more than 7 times.

Step 4: The TPU yarn drawn in Step 3 is wound up.

As described above, the present invention uses nanosilica having a particle size of 100 nm or less not only to continuously draw the TPU yarn without thread breakage in the drawing step (Step 3) and the winding step (Step 4) but also to draw a single filament yarn (that is, by the number of fillers) having a denier count of 50 or less in the manufacture of multi-filament (TPU) yarns.

In order to determine the physical characteristic of the TPU yarn (preferably, mono- and multi-filament yarns) prepared by the above-described method, the present invention presents the physical characteristics of the resin for TPU yarn containing nanosilica having a particle size of 100 nm or less and the resin for TPU yarn prepared from a master batch containing nanosilica having a particle size of 100 nm or less in Tables 1 and 2, respectively.

Firstly, nanosilica is added to a general TPU by its content and a polymerization is performed to prepare a resin for TPU yarn. A test is performed, and the results are presented in Table 1.

In other words, nanosilica is added in an amount of 0 phr, 3 phr, 5 phr, 7 phr, or 10 phr and used for polymerization to prepare a resin for TPU yarn containing nanosilica according to the present invention. A comparison is made in regards to the change of viscosity, extrusion workability, and the surface condition. At this point, the present invention uses a polyester polyol-based TPU having a hardness of shore 75D.

of 5 phr according to the present invention, the workability during the extrusion is good and the extrusion works without thread breakage to produce a TPU yarn with smooth surface.

When a yarn is processed using a resin for TPU yarn (brand name: T-75D-4) containing nanosilica in an amount of 7 phr according to the present invention, the workability during the extrusion is good with melt flow index of 18.25 g/10 min and flow beginning temperature of 221.3° C., and the melt viscosity (Pa·s) is 42550 at 230° C. and 15090 at 235° C., causing no thread breakage and producing a TPU yarn with smooth surface.

When a yarn is processed using a resin for TPU yarn (brand name: T-75D-5) containing nanosilica in an amount of 10 phr according to the present invention, the surface of the TPU yarn is extremely slippery.

TABLE 1

| Test grade | MFI (230° C., 2.16 kg) (g/10 min) | T (° C.) | Melt viscosity (Pa · s) 230° C. | 235° C. | Content of TPU yarn containing nanosilica | Extrusion workability and surface condition Multi-filament yarn (5 denier, 35 fillers) | Mono-filament (150-200 denier) |
|---|---|---|---|---|---|---|---|
| T-75D-1 | 30.21 | 218.4 | 32620 | 10060 | 0 phr | Unworkable, runny | Thread breakage, coarse surface |
| T-75D-2 | 28.33 | 219.5 | 33480 | 11670 | 3 phr | Good extrusion workability, frequent thread breakage | Good extrusion workability, smooth surface without thread breakage |
| T-75D-3 | 25.42 | 220.6 | 38570 | 13150 | 5 phr | Good extrusion workability, smooth surface without thread breakage | Good extrusion workability, smooth surface without thread breakage |
| T-75D-4 | 18.25 | 221.3 | 42550 | 15090 | 7 phr | Good extrusion workability, smooth surface without thread breakage | Good extrusion workability, smooth surface without thread breakage |
| T-75D-5 | 12.33 | 222.5 | 48080 | 17220 | 10 phr | Too slippery surface with severe crystallization | Too slippery surface with thread breakage due to crystallization |

In the Table 1, the terms "T-75D-1", "T-75D-2", "T-75D-3", "T-75D-4", and "T-75D-5" listed in the test grade section refer to the brand names of the resins for TPU yarn, more specifically the TPU yarns containing nanosilica having a particle size of 100 nm or less in an amount of 0 phr, 3 phr, 5 phr, 7 phr, and 10 phr, respectively.

The extrusion workability and the surface condition of the TPU yarns can be described with reference to Table 1 as follows.

When a yarn is processed using a resin for TPU yarn (brand name: T-75D-1) prepared without the novel resin mixed with nanosilica, the resin is extremely runny during the extrusion process, ending up producing TPU yarns with coarse surface.

When a yarn is processed using a resin for TPU yarn (brand name: T-75D-2) containing nanosilica in an amount of 3 phr according to the present invention, the workability during the extrusion is good and the surface of the yarn is smooth without thread breakage.

When a yarn is processed using a resin for TPU yarn (brand name: T-75D-3) containing nanosilica in an amount As described above, it is revealed from the experiments that the most desirable amount of the resin is 7 phr in the manufacture of a TPU yarn using nanosilica according to the present invention. In addition, the use of the nanosilica in an amount of 10 phr or greater makes it difficult to mix the nanosilica with the liquid base material.

Secondly, tests are performed by the amount of the master batch containing nanosilica mixed with general TPU. The test results are presented in Table 2.

In other words, the master batch of the present invention (containing 30 wt. % of nanosilica) is added in an amount of 0 phr, 3 phr, 5 phr, 10 phr, or 20 phr and mixed with general TPU to prepare a TPU yarn. A comparison is made in regards to the change of viscosity, extrusion workability, and the surface condition. At this point, the present invention uses a polyester polyol-based TPU having a hardness of shore 75D.

TABLE 2

| Test grade | MFI (230° C., 2.16 kg) (g/10 min) | T (° C.) | Melt viscosity (Pa · s) 230° C. | Melt viscosity (Pa · s) 235° C. | Content of TPU yarn containing nanosilica | Extrusion workability and surface condition Multi-filament yarn (5 denier, 35 fillers) | Extrusion workability and surface condition Mono-filament (150-200 denier) |
|---|---|---|---|---|---|---|---|
| NS-75D-1 | 19.58 | 215.2 | 35580 | 10010 | 0 phr | Unworkable, runny | Thread breakage, coarse surface |
| NS-75D-2 | 16.83 | 216.3 | 31860 | 11450 | 3 phr | Press shaking during extrusion, frequent thread breakage | Press shaking during extrusion, thread breakage, slightly coarse surface |
| NS-75D-3 | 14.32 | 218.2 | 40950 | 12830 | 5 phr | Good extrusion workability, smooth surface without thread breakage | Good extrusion workability, smooth surface without thread breakage |
| NS-75D-4 | 8.35 | 222.3 | 44380 | 14030 | 10 phr | Good extrusion workability, smooth surface without thread breakage | Good extrusion workability, smooth surface without thread breakage |
| NS-75D-5 | 6.23 | 219.5 | 50570 | 16930 | 20 phr | Too slippery surface with severe crystallization | Good extrusion workability, but too slippery surface |

In the Table 2, the terms "NS-75D-1", "NS-75D-2", "NS-75D-3", "NS-75D-4", and "NS-75D-5" listed in the test grade section refer to the brand names of the resins for TPU yarn, more specifically the TPU yarns containing the master batch in an amount of 0 phr, 3 phr, 5 phr, 10 phr, and 20 phr, respectively.

The extrusion workability and the surface condition of the TPU yarns can be described with reference to Table 2 as follows.

When a yarn is processed using a resin for TPU yarn (brand name: NS-75D-1) prepared without the master batch of the present invention, the resin is extremely runny during the extrusion process to cause severe step difference, ending up producing TPU yarns with coarse surface.

When a yarn is processed using a resin for TPU yarn (brand name: NS-75D-2) containing the master batch of the present invention in an amount of 3 phr, the resin is somewhat runny to cause a step difference and produce TPU yarns with slightly coarse surface.

When a yarn is processed using a resin for TPU yarn (brand name: NS-75D-3) containing the master batch of the present invention in an amount of 5 phr, the workability during the extrusion is good with melt flow index of 14.32 g/10 min and flow beginning temperature of 218.2° C., and the melt viscosity (Pa·s) is 40950 at 230° C. and 12830 at 235° C., causing no step difference during extrusion and producing a TPU yarn with smooth surface.

When a yarn is processed using a resin for TPU yarn (brand name: NS-75D-4) containing the master batch of the present invention in an amount of 10 phr, the workability during the extrusion is good with melt flow index of 8.35 g/10 min and flow beginning temperature of 222.3° C., and the melt viscosity (Pa·s) is 44380 at 230° C. and 14030 at 235° C., causing no step difference during extrusion and producing a TPU yarn with smooth surface.

When a yarn is processed using a resin for TPU yarn (brand name: NS-75D-5) containing the master batch of the present invention in an amount of 20 phr, the workability during the extrusion is good without step difference, but the surface of the TPU yarn is slippery.

As described above, it is revealed from the experiments that the most desirable amount of the master batch (containing 30 wt. % of nanosilica in concentration) is 5 to 10 phr in the manufacture of a TPU yarn using the master batch of the present invention and TPU. In addition, the use of the mater bath in an amount of 20 phr or greater causes a severe blooming effect in the TPU yarn.

Table 3 shows a comparison of physical characteristics between a single type TPU yarn made using nanosilica and a single type TPU yarn made using general silica. Namely, the test results are given specifically to present a comparison between a TPU yarn prepared using nanosilica having a particle size of 100 nm or less and a TPU yarn prepared using silica having a particle size of 300 to 500 nm.

TABLE 3

| Items | Using general silica | Using nanosilica | Ref. |
|---|---|---|---|
| TPU grade | Resin for single type TPU yarn (brand name: NS-75D-10) | Resin for single type TPU yarn (brand name: NS-75D-4) | General silica, 30 wt. % nanosilica, Using 10 phr of TPU |
| Silica Primary particle size | 300-500 nm | 100 nm or less | Primary particle size of general nanosilica is 10 nm or less. |
| TPU MFI (melt flow index) | 7.3 | 8.35 | 230° C., 2.16 kgf |
| TPU Tfb (flow beginning temp.) | 224.5 | 222.3 | |

TABLE 3-continued

| Items | Using general silica | Using nanosilica | Ref. |
|---|---|---|---|
| TPU tensile strength | 250 kgf/cm$^2$ | 350 kgf/cm$^2$ | Using injected specimens |
| TPU tear strength | 178 kgf/cm | 205 kgf/cm | Using injected specimens |
| TPU specific gravity | 1.23-1.21 | 1.22-1.25 | g/cc |
| TPU hardness | 75 ± 3D | 75 ± 3D | Shore D |
| TPU yarn thickness | 150-200 denier | 150-200 denier | Mono-filament yarn |
| TPU surface condition | Very coarse | Good (smooth) | |
| Extrusion workability | Silica size causes severe step difference and difficulty in extrusion and drawing processes. | Nanosilica is used to serve as a drawing reinforcing agent during the drawing process to secure workability without step difference. | |

As can be seen from Table 3, the single type TPU yarn prepared using general silica (namely, silica having a particle size of 300-500 nm) has the yarn surface coarse with poor extrusion workability. Particularly, it is impossible to manufacture a thin multi-filament yarn of which the single filament yarn (namely, filler-based) has a denier count below 50.

In the present invention, however, the single type (mono- or multi-filament) TPU yarn prepared using nanosilica having a particle size of 100 nm or less has the yarn surface smooth and displays good productivity and workability as it can be drawn continuously without thread breakage during the extrusion process.

What is claimed is:

1. A method for manufacturing a core-free thermoplastic polyurethane yarn, comprising:
    preparing liquid base materials of polyol, isocyanate and glycol chain extender for polymerization of TPU pellets, selecting one of the liquid base materials, adding nanosilica having a particle diameter of 100 nm or less, and mixing the liquid base material and the nanosilica together;
    adding the nanosilica-dispersed liquid base material and the other two base materials into an extruder and polymerizing TPU pellets to prepare a resin for TPU yarn; and
    adding the resin for TPU yarn into an extruder for yarn production and performing a melt extrusion to produce the core-free thermoplastic polyurethane yarn.

2. A method for manufacturing a core-free thermoplastic polyurethane yarn, comprising:
    mixing thermoplastic polyurethane and nanosilica having a particle diameter of 100 nm or less to prepare a master batch in the form of pellet, mixing the master batch and thermoplastic polyurethane together and then compounding the master batch and the thermoplastic polyurethane to prepare a resin for production of yarn, wherein the master batch is prepared from one of liquid base materials of polyol, isocyanate and glycol chain extender mixed with said nanosilica; and
    adding the resin for yarn production into an extrusion for yarn production and performing a melt extrusion to prepare the core-free thermoplastic polyurethane yarn,
    wherein the core-free thermoplastic polyurethane yarn is a multi-filament yarn formed with a plurality of single filament yarns, each of the single filament yarns having a denier count of 50 or less.

3. A method for manufacturing a core-free thermoplastic polyurethane yarn, comprising:
    mixing thermoplastic polyurethane and nanosilica having a particle diameter of 100 nm or less to prepare a master batch in the form of pellet, mixing the master batch and thermoplastic polyurethane together and then compounding the master batch and the thermoplastic polyurethane to prepare a resin for production of yarn, wherein the master batch is prepared from one of liquid base materials of polyol, isocyanate and glycol chain extender mixed with said nanosilica; and
    adding the resin for yarn production into an extrusion for yarn production and performing a melt extrusion to prepare the core-free thermoplastic polyurethane yarn,
    wherein the core-free thermoplastic polyurethane yarn is a mono-filament yarn having a denier count of 50 to 350.

4. The method of claim 1, wherein the core-free thermoplastic polyurethane yarn is a multi-filament yarn formed with a plurality of single filament yarns, each of the single filament yarns having a denier count of 50 or less.

5. The method of claim 1, wherein the core-free thermoplastic polyurethane yarn is a mono-filament yarn having a denier count of 50 to 350.

* * * * *